US005174696A

United States Patent [19]

Bogner

[11] Patent Number: 5,174,696

[45] Date of Patent: Dec. 29, 1992

[54] PLUG-IN HOLDER FOR CENTERING DRILL BIT

[75] Inventor: Werner Bogner, Munich, Fed. Rep. of Germany

[73] Assignee: Hilti Aktiengesellschaft, Furstentum, Liechtenstein

[21] Appl. No.: 751,293

[22] Filed: Aug. 28, 1991

[30] Foreign Application Priority Data

Sep. 1, 1990 [DE] Fed. Rep. of Germany ....... 4027820

[51] Int. Cl.[5] ............................................ B23B 51/04

[52] U.S. Cl. ...................................... 408/206; 279/22; 279/79; 279/905; 408/240

[58] Field of Search ..................... 279/1 B, 22, 30, 79, 279/80, 905; 408/204, 206, 209, 226, 231, 240

[56] References Cited

U.S. PATENT DOCUMENTS

| | | | |
|---|---|---|---|
| 1,858,276 | 5/1932 | Miller | 279/79 |
| 1,862,337 | 6/1932 | Emrick | 279/79 |
| 3,243,924 | 4/1966 | Peters | 408/204 |
| 4,900,202 | 2/1990 | Wienhold | 279/22 |

FOREIGN PATENT DOCUMENTS

| | | | |
|---|---|---|---|
| 891043 | 8/1953 | Fed. Rep. of Germany | 408/209 |
| 10416 | 1/1983 | Japan | 408/209 |

*Primary Examiner*—Daniel W. Howell
*Attorney, Agent, or Firm*—Anderson Kill Olick & Oshinsky

[57] ABSTRACT

A plug-in holder (2) of a drilling tool has an axially extending central bore for receiving a centering drilling bit. The holder (2) has an opening (5) extending from the bore to its outer surface. A latching element (6) is radially displaceably supported in the opening (5). The bore (4) has inwardly projecting entrainment ridges (9). The latching element (6) holds the centering drill bit in the axial direction while the entrainment ridges (9) engage the bit for rotational displacement.

8 Claims, 1 Drawing Sheet

PLUG-IN HOLDER FOR CENTERING DRILL BIT

BACKGROUND OF THE INVENTION

The present invention is directed to a plug-in holder for a centering drill bit in a drilling tool. The plug-in holder has an annular groove for receiving cylindrically shaped arresting elements of a tool chuck in a drilling device. The arresting elements extend tangentially of the annular groove.

In the device disclosed in DE a 34 34 076, the tool bit is automatically centered, in a tolerance free manner, upon insertion into a conically shaped receiving aperture while in abutment with the wall of the aperture. The rotational entrainment of the tool bit occurs by means of driving or entrainment ridges in the tool bit holder which engage in grooves in the tool bit. Axial retention of the tool bit is afforded by essentially radially displaceable pins extending tangentially to the receiving aperture and shiftable into corresponding recesses, particularly into an annular groove in the tool bit.

In electrical or sanitary installations in structures, appropriate openings must be placed in the walls. Such opening can be through bores for pipes or depressions for flush mounted sockets for switches or plug-in sockets.

Such opening usually has a large diameter. To use core drill bits of the required size, larger drilling devices are needed. These drilling devices are fastened through a base plate by a vacuum or anchoring attachments to the structural component. The drilling device is secured along with the core drill bit to the base plate.

There are certain cases, however, which require a smaller diameter opening and can easily be drilled with a hand held drilling device.

The difficulty involved with a hand held drilling device is that the core drill bit runs off center when it is applied to the structural component. Accordingly, the required accuracy in the formation of the opening can not be achieved with such a core drill bit. In the state of the art as set forth in DE A 30 29 101, a hollow core drill bit is provided with a centering bit and the core drill bit has diamond grinding segments at its drilling end. The centering bit is clamped in a rear attachment of a carrier member by a locking screw.

A spirally shaped section of the centering bit extends at least for the full axial length of the core drill bit. The centering bit remains clamped in the core drill bit during the entire drilling step.

Depending on the material of the structural component being drilled, there is the disadvantage that torques of different magnitude act on the centering bit in a blow-like manner. A locking screw pressed radially against the smooth cylindrical shank of the centering bit can not assure a secure slip-free clamping of the bit in the carrier member. If the centering bit slips it can not drill into the structural component.

When installing the shank of the centering bit in the carrier member, care must be taken that a specific spacing is maintained between the drilling end face of the diamond segments and the tip of the centering bit. Continuous use of the centering bit during the drilling step requires frequent regrinding and, as a result, a continuous reduction in the length of the centering bit. Accordingly, the shank end of the centering bit can not be abutted at the base of the receiving bore in the carrier member. Therefore, there is the danger that the centering bit is axially displaced when applied to the structural component or during the drilling operation causing it to move opposite to the drilling direction. It is possible that the tip at the leading end of the centering bit may move opposite to the drilling direction into the hollow carrier member rearwardly of the drilling face of the core drill bit and, as a result, centering of the core drill bit can not be effected.

SUMMARY OF THE INVENTION

Therefore, the primary object of the present invention is to provide a holder for receiving a centering bit in a hollow core drill bit so that the centering bit can be rapidly and simply inserted into and removed from the trailing end of the core drill bit while assuring that the core drill bit is accurately centered.

In accordance with the present invention, the plug-in holder has a central bore open in the drilling direction with an opening in the holder extending from an annular groove in its outer surface into the central bore. A radially displaceable latching element is supported in the opening and it has a radial dimension exceeding the wall thickness of the holder in the region of the annular groove.

Accordingly, it is possible, based on the invention, to secure the shank of a centering bit in the plug-in holder centered within a hollow core drill bit.

Preferably, the radially inner end of the opening in the holder has a smaller cross-section at the central bore than the cross-section of the latching element extending transversely of the radial direction. The radially inner end of the opening can have a conical constriction while it is largely cylindrical for the remainder of its length extending radially outwardly. The constriction at the inner end of the opening prevents the latching elements from falling out of the opening into the central bore. The latching element can have a variety of shapes. The cross-section of the latching element can be multi-sided or rounded. Preferably, a ball shaped latching element is used.

A spring element is located in the annular groove and prevents the latching element from falling out of the opening through the outside surface of the holder. This spring element can be formed of metal, plastics material or rubber and may be in the form of a compression or leaf spring.

Preferably, the spring element is an elastic ring. Such an elastic ring can be formed of metal, plastics material or rubber. The cross-section of the ring can have different shapes, such as round or multi-sided.

One or a plurality of entrainment projections or ridges, for rotationally entraining the centering bit, extend radially inwardly into the central bore. The flanks of the entrainment ridges extend approximately radially into the central bore. In an advantageous embodiment of the invention, the latching elements are held in position projecting into the central bore by arresting elements on the drilling device seated in the annular groove.

The core drill bit can be made up of two parts with a hollow cylinder connected with the plug-in holder by a detachable connection, particularly a threaded connection. This arrangement has the advantage that the plug-in holder can be used as a adaptor for the hollow cylinder on which the core drill bit of different diameters can be attached. The hollow cylinder can be provided with an external thread and the core drill bit itself with a matching internal thread. In another embodiment the external thread can be provided on the hollow cylinder with the holder or adaptor provided with a matching internal thread. It is also possible to form a centering bore in the constructural component without the hollow cylinder by attaching the core drill bit directly to the holder. The core drill bit can be assembled to fit the particular conditions encountered.

Accordingly, based on the present invention, it is possible to provide a number of different combinations, for instance, the plug-in holder with the core drill bit, the plug-in holder with a centering bit, or the plug-in holder with the core drill bit and a centering bit.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
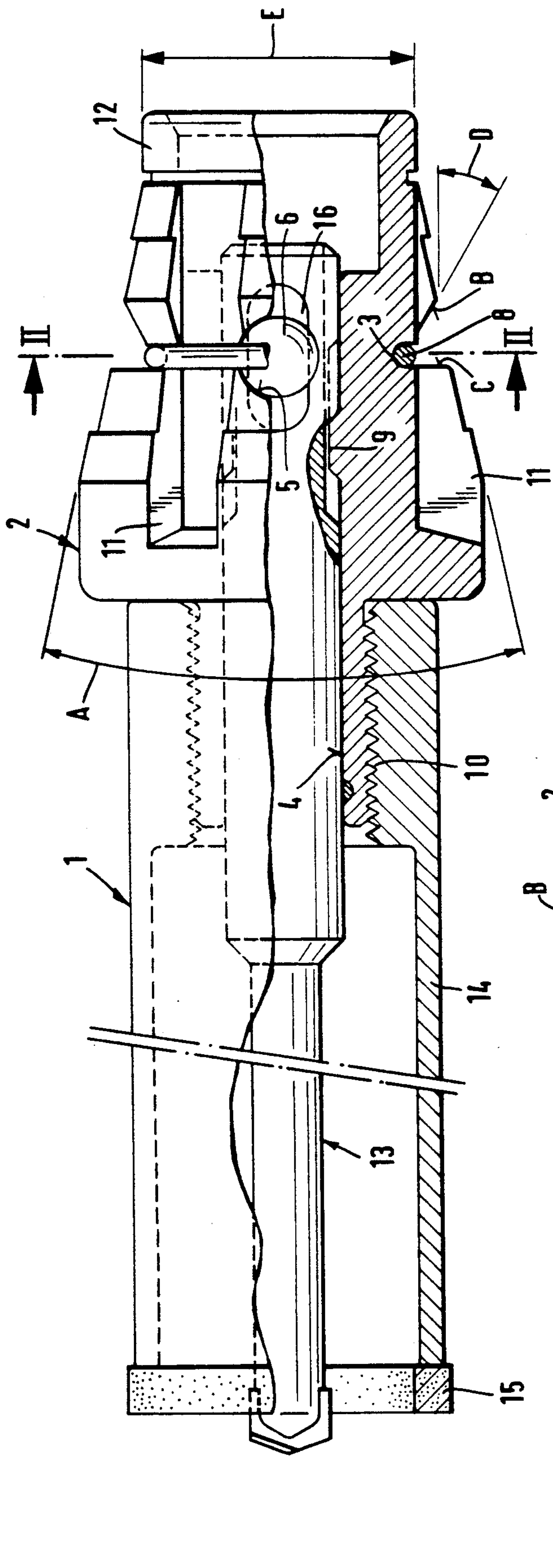
FIG. 1 is an axially extending view, partly in section, of a core drill bit with a plug-in holder receiving a centering bit, in accordance with the present invention.
Figure 2:
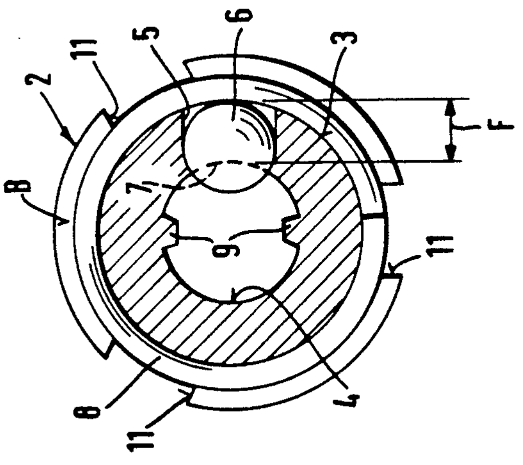
FIG. 2 is a sectional view taken along the line II—II in FIG. 1, but without the centering bit.

FIG. 1 shows a drilling tool 1 with a hollow core drill bit 15 comprising diamond grains. A plug-in holder 2 is located at the opposite end of the drilling tool 1 from the core drill bit 15 and a hollow cylinder 14 extends between the core drill bit and the holder. At the opposite end from the drill bit 15 the hollow cylinder 14 is secured on the plug-in holder 2 by a thread 10.

The plug-in holder 2 has a conically shaped outer surface with a cone apex angle A shaped to correspond to an insertion aperture in a known drilling device chuck, not shown. Preferably, the apex angle A is less than 25°. A trailing end section 12 of the holder 2 has an outside diameter E corresponding to the diameter of a receiving sleeve in the drilling device, not shown.

The outer surface of the holder 2 has axially extending parallel grooves 11 equiangularly spaced around the holder circumference for achieving a positively locked engagement of entrainment parts on the drilling device, not illustrated. Furthermore, an annular groove 3 is formed in the conically shaped outer surface of the holder approximately midway between the ends of the holder. The groove 3 has a pair of opposite flanks B, C with the flank B located closer to the trailing or right hand end of the holder as viewed in FIG. 1, and the flank C closer to the leading end. Flank B is inclined at an angle of 30° relative to the axis of a central bore 4 extending through the holder. The other flank C extends substantially perpendicularly to the axis of the central bore 4. Central bore 4 is open in the drilling direction and has an opening 5 extending inwardly from the annular groove 3 to the central bore 4. A radially displaceable latching element 6 is supported in the opening 5. The opening 5 has a dimension F through the wall of the holder 2 smaller than the diameter of the latching element 6. In the central bore 4, there are two diametrically opposed entrainment ridges 9 extending into the central bore. Accordingly, a shank on an axially extending centering bit 13 is centrally located within the core drill bit 15 by means of the holder 2.

By rotating the shank of the centering bit 13, grooves extended from its trailing end register with the entrainment ridges 9 so that the ridges fit closely within the grooves. As the grooves in the trailing end of the centering bit ride over the entrainment ridges 9, the latching element 6 located in the region of the groove 3 moves into engagement with the recess 16 in the centering bit shank with the latching element moving radially inwardly through the opening 5. The recess 16 serves merely for axially latching the centering bit 13 in the holder 2.

Due to the at least approximately radially extending planar flanks on the entrainment ridges 9, rotary engagement with the centering bit is effected with the forces to be transmitted arranged approximately perpendicularly to the cooperating surfaces. The force transmission is maintained even in a state of advanced wear at the cooperating surfaces and does not act at the edges. Because of the ball shape of the latching element 6 the stresses and the wear acting on the centering bit are greatly reduced.

The opening 5 through the wall of the holder 2 has a cross-sectional constriction at the surface of the central bore 4 in the holder. The constriction prevents the latching element 6 from falling into the bore. To prevent the latching element 6 from falling out of the opening 5 in the opposite direction, a spring element 8 is located in the base of the annular groove 3 and is formed as an elastic ring. This ring can be formed of metal, plastics material or rubber. The cross-section of the ring, while shown as being round in FIG. 1, can have different shapes.

While specific embodiments of the invention have been shown and described in detail to illustrate the application of the inventive principles, it will be understood that the invention may be embodied otherwise without departing from such principles.

I claim:

1. A plug-in holder (2) for receiving a drill bit (1) and arranged to be connected to a drilling device, said plug-in holder (2) comprising an axially extending annular wall forming an axially extending central bore (4), said annular wall having an axially extending inner surface defining the bore and a generally axially extending outer surface, said holder (2) having a leading end surface and a trailing end surface each extending transversely of the axial direction, an annular groove (3) formed in the outer surface between the leading and trailing end surfaces, wherein the improvement comprises at least one opening (5) extending in the radial direction through said annular wall from said central bore (4) to said annular groove, a radially displaceable latching element (6) seated in said opening (5), said latching element having a dimension extending in the radial direction of said annular wall greater than the radial dimension of said annular wall (4) in the region of said opening (5), a centering bit (13) fitted in said central bore (4), said latching element (6) arranged to engage a recess (16) in said centering bit, said centering bit inserted into said central bore having an axial dimension exceeding the axial dimension of said latching element for effecting axial retention, said holder (2) has an axially extending annular section projecting from the leading end surface and having a smaller diameter than the outer surface, said drilling bit has a leading end and a trailing end spaced apart in the axial direction and comprises an annular core drill bit (15) at the leading end and a hollow cylinder (14) extending from the core drill bit to the trailing end of said drilling bit, said hollow cylinder has an inside surface arranged at the trailing end to be detachably connected to said holder section for utilizing different diameter drilling bits with said holder.

2. A plug-in holder, as set forth in claim 1, wherein said opening (5) at the inner surface of said holder has a smaller cross-section than the cross-section of said latching element (6) extending generally parallel with the axis of the central bore (4).

3. A plug-in holder, as set forth in claim 1, wherein a spring element (8) is located in the annular groove (3) for preventing the latching element (6) from being displaced radially outwardly from the opening (5).

4. A plug-in holder, as set forth in claim 3, wherein said spring element (8) is an elastic ring.

5. A plug-in holder, as set forth in claim 1, wherein said latching element (6) is ball shaped.

6. A plug-in holder, as set forth in claim 1, wherein said central bore has at least one entrainment ridge (9) extending radially inwardly from said inner surface for effecting rotational entrainment with the centering bit inserted into said holder (2).

7. A plug-in holder (2) for receiving a drill bit (1) and arranged to be connected to a drilling device, said plug-in holder (2) comprising an axially extending annular wall forming an axially extending central bore (4), said annular wall having an axially extending inner surface defining the bore and a generally axially extending outer surface, said holder (2) having a leading end surface and a trailing end surface each extending transversely of the axial direction, an annular groove (3) formed in the outer surface between the leading and trailing end surfaces, wherein the improvement comprises at least one opening (5) extending in the radial direction through said annular wall from said central bore (4) to said annular groove, a radially displaceable latching element (6) seated in said opening (5), said latching element having a dimension extending in the radial direction of said annular wall greater than the radial dimension of said annular wall (4) in the region of said opening (5), a centering bit (13) fitted in said central bore (4), said latching element (6) arranged to engage a recess (16) in said centering bit, said centering bit inserted into said central bore having an axial dimension exceeding the axial dimension of said latching element for effecting axial retention, a hollow cylinder is connected to said holder (2) and extends axially from the leading end thereof, and the drilling bit comprises a core drill bit (15) located at the end of the hollow cylinder (14) spaced axially from the holder, and said centering bit (13) having an axially elongated shank extending into the central bore (4) in said holder and said shank having the recess (16) therein for receiving said latching element (6) for effecting axial retention of said centering bit in said holder.

8. A plug-in holder (2) for receiving a drill bit (1) and arranged to be connected to a drilling device, said plug-in holder (2) comprising an axially extending annular wall forming an axially extending central bore (4), said annular wall having an axially extending inner surface defining the bore and a generally axially extending outer surface, said holder (2) having a leading end surface and a trailing end surface each extending transversely of the axial direction, an annular groove (3) formed in the outer surface between the leading and trailing end surfaces, wherein the improvement comprises at least one opening (5) extending in the radial direction through said annular wall from said central bore (4) to said annular groove, a radially displaceable latching element (6) seated in said opening (5), said latching element having a dimension extending in the radial direction of said annular wall greater than the radial dimension of said annular wall (4) in the region of said opening (5), a centering bit (13) fitted in said central bore (4), said latching element (6) arranged to engage a recess (16) in said centering bit, said centering bit inserted into said central bore having an axial dimension exceeding the axial dimension of said latching element for effecting axial retention, axially extending parallel grooves (11) are located in the outer surface of said annular wall, said parallel grooves traverse said annular groove and are arranged for achieving locked engagement with the drilling device.

* * * * *